(12) United States Patent
Kang

(10) Patent No.: US 11,258,931 B2
(45) Date of Patent: Feb. 22, 2022

(54) CAMERA MODULE

(71) Applicant: LG INNOTEK CO., LTD., Seoul (KR)

(72) Inventor: Jong Hyun Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/971,938

(22) PCT Filed: Feb. 21, 2019

(86) PCT No.: PCT/KR2019/002130
§ 371 (c)(1),
(2) Date: Aug. 21, 2020

(87) PCT Pub. No.: WO2019/164296
PCT Pub. Date: Aug. 29, 2019

(65) Prior Publication Data
US 2021/0092264 A1 Mar. 25, 2021

(30) Foreign Application Priority Data
Feb. 23, 2018 (KR) .................... 10-2018-0022126

(51) Int. Cl.
H04N 5/225 (2006.01)
G03B 13/36 (2021.01)
G03B 17/12 (2021.01)
(52) U.S. Cl.
CPC ........... *H04N 5/2254* (2013.01); *G03B 13/36* (2013.01); *G03B 17/12* (2013.01); *H04N 5/2253* (2013.01)

(58) Field of Classification Search
CPC .... H04N 5/2254; H04N 5/2253; G03B 13/36; G03B 17/12; G03B 5/00
See application file for complete search history.

(56) References Cited

U.S. PATENT DOCUMENTS

2007/0154198 A1* 7/2007 Oh ...................... G02B 13/009
396/85
2009/0180202 A1* 7/2009 Knoedgen ............ H04N 5/2254
359/824

(Continued)

FOREIGN PATENT DOCUMENTS

JP 2006-98576 A 4/2006
JP 2008-185913 A 8/2008

(Continued)

*Primary Examiner* — Abdelaaziz Tissire
(74) *Attorney, Agent, or Firm* — Birch, Stewart, Kolasch & Birch, LLP

(57) ABSTRACT

A camera module includes first to third lens groups; a first mover configured to move the second lens group in the optical-axis direction; a second mover configured to move the third lens group in the optical-axis direction; a base accommodating the first mover and the second mover; a support ball disposed to be in rolling contact with the first mover, the second mover, and the base, the support ball supporting movement of the first mover and the second mover relative to the base; a driving magnet coupled to each of the first mover and the second mover; and a coil part coupled to the base, the coil part being disposed to face the driving magnet, and wherein an entirety of a surface of the driving magnet that faces the moving coil serves as a first pole.

20 Claims, 12 Drawing Sheets

(56) References Cited

U.S. PATENT DOCUMENTS

| | | | |
|---|---|---|---|
| 2017/0108705 A1* | 4/2017 | Yu | G02B 13/009 |
| 2019/0049687 A1* | 2/2019 | Bachar | G02B 27/646 |
| 2019/0377155 A1* | 12/2019 | Bachar | G02B 7/08 |

FOREIGN PATENT DOCUMENTS

| | | |
|---|---|---|
| JP | 2012-32810 A | 2/2012 |
| JP | 2017-198727 A | 11/2017 |
| KR | 10-2005-0042722 A | 5/2005 |
| KR | 10-2010-0048246 A | 5/2010 |
| KR | 10-2014-0142189 A | 12/2014 |
| KR | 10-2017-0123051 A | 11/2017 |
| WO | WO 2017/188771 A1 | 11/2017 |

* cited by examiner

[FIG. 1]
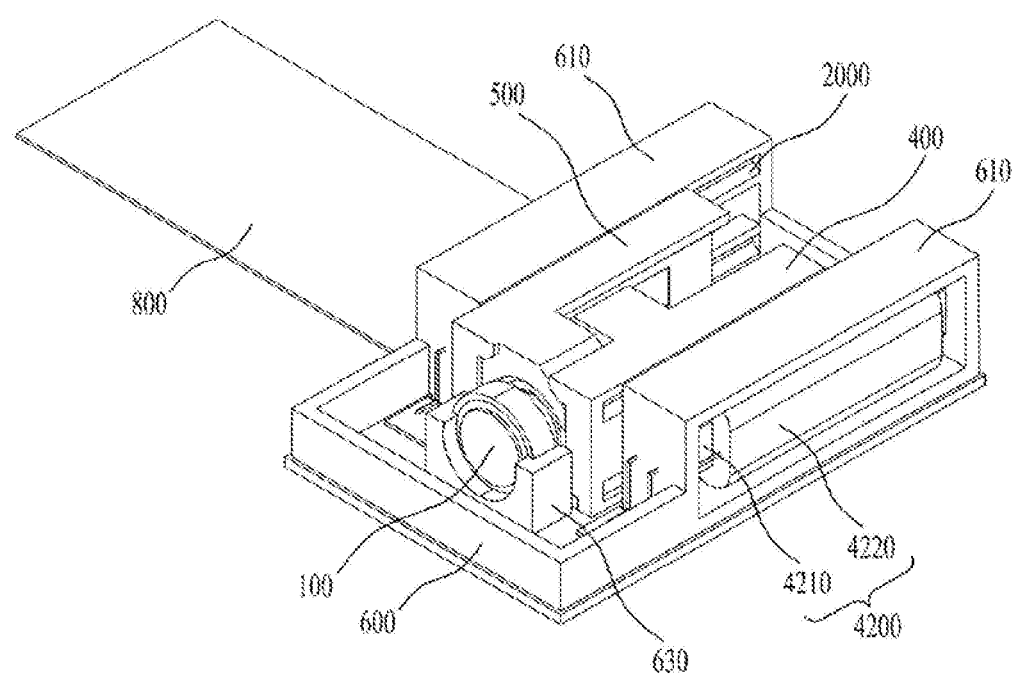

【FIG. 2】
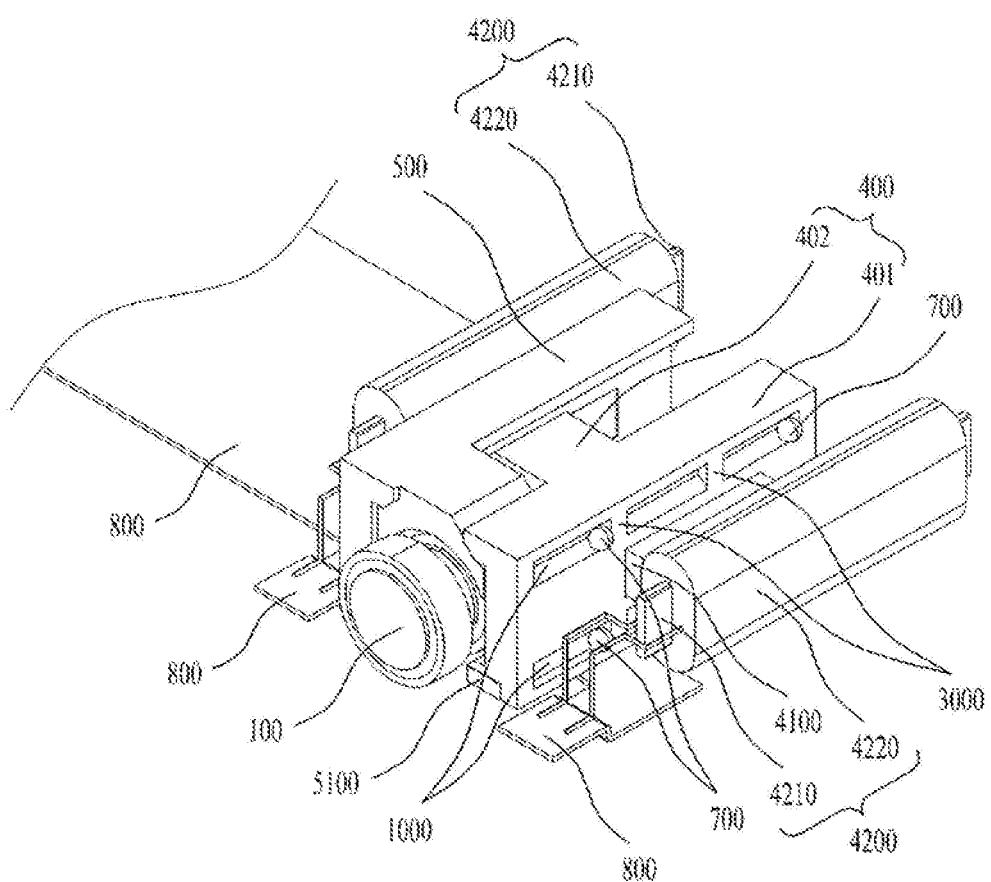

[FIG. 3]
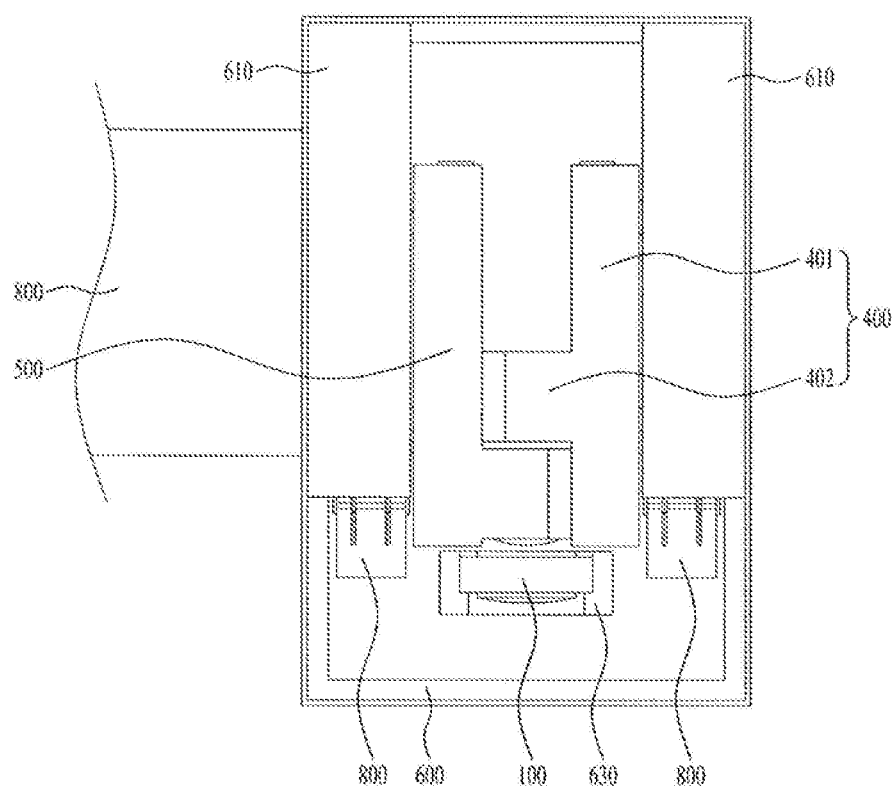

[FIG. 4]
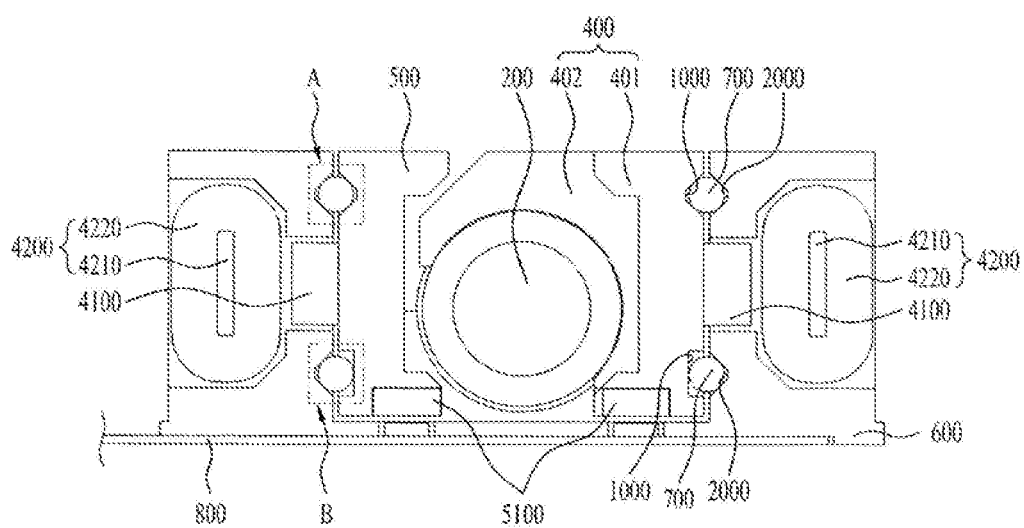

[FIG. 5]
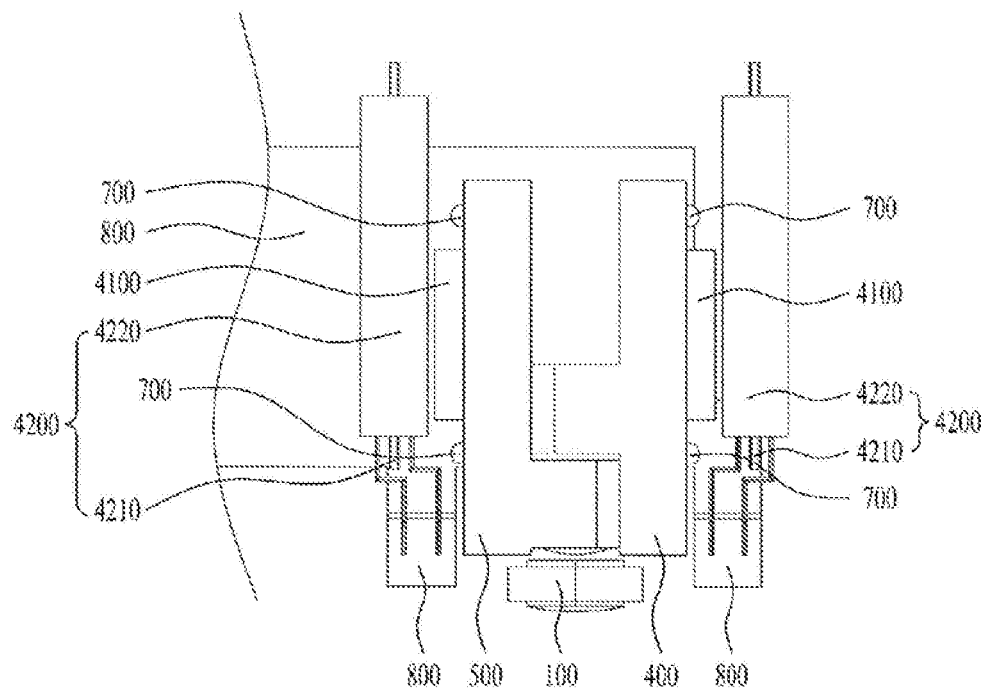
[FIG. 6]
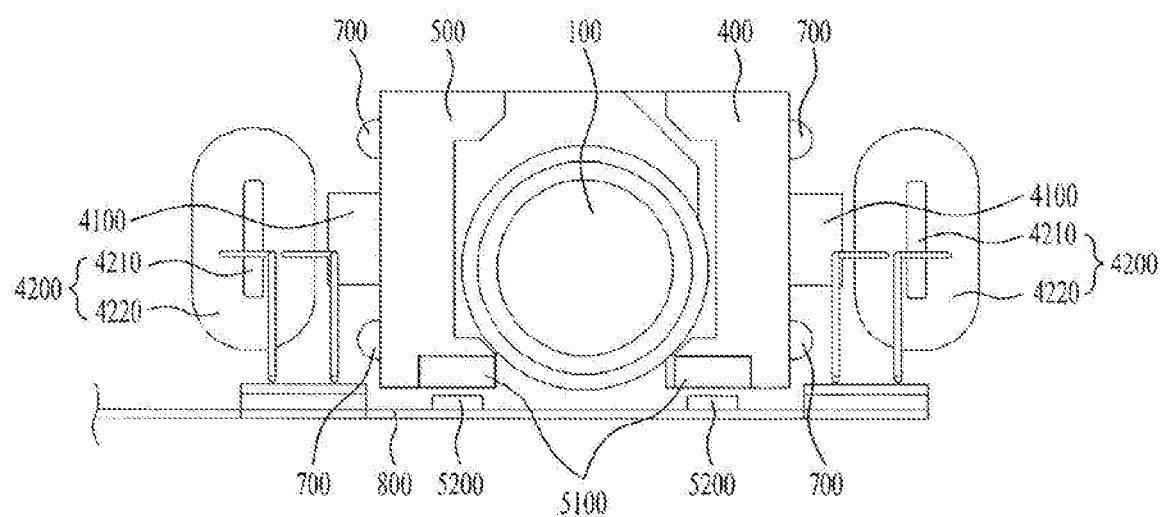

[FIG. 7]
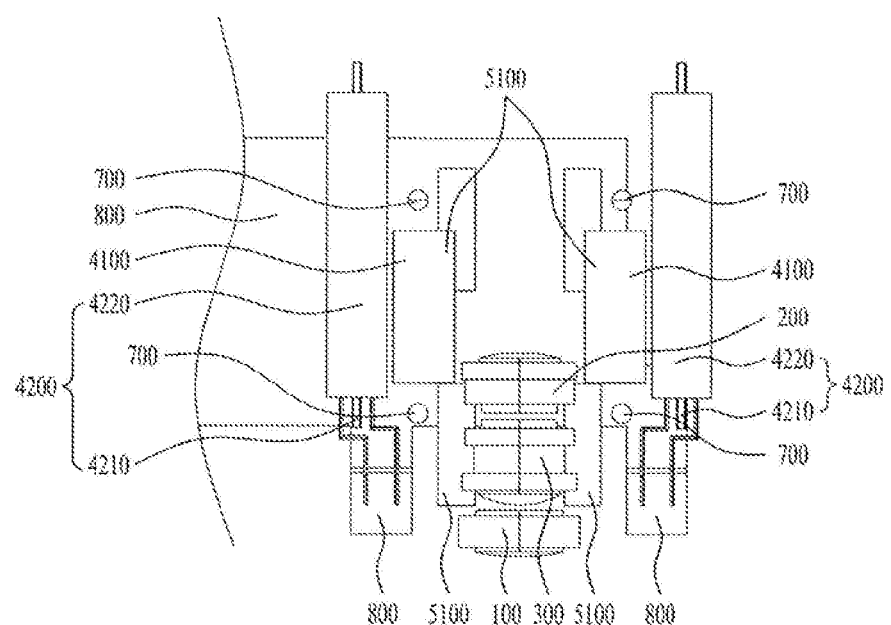

[FIG. 8]
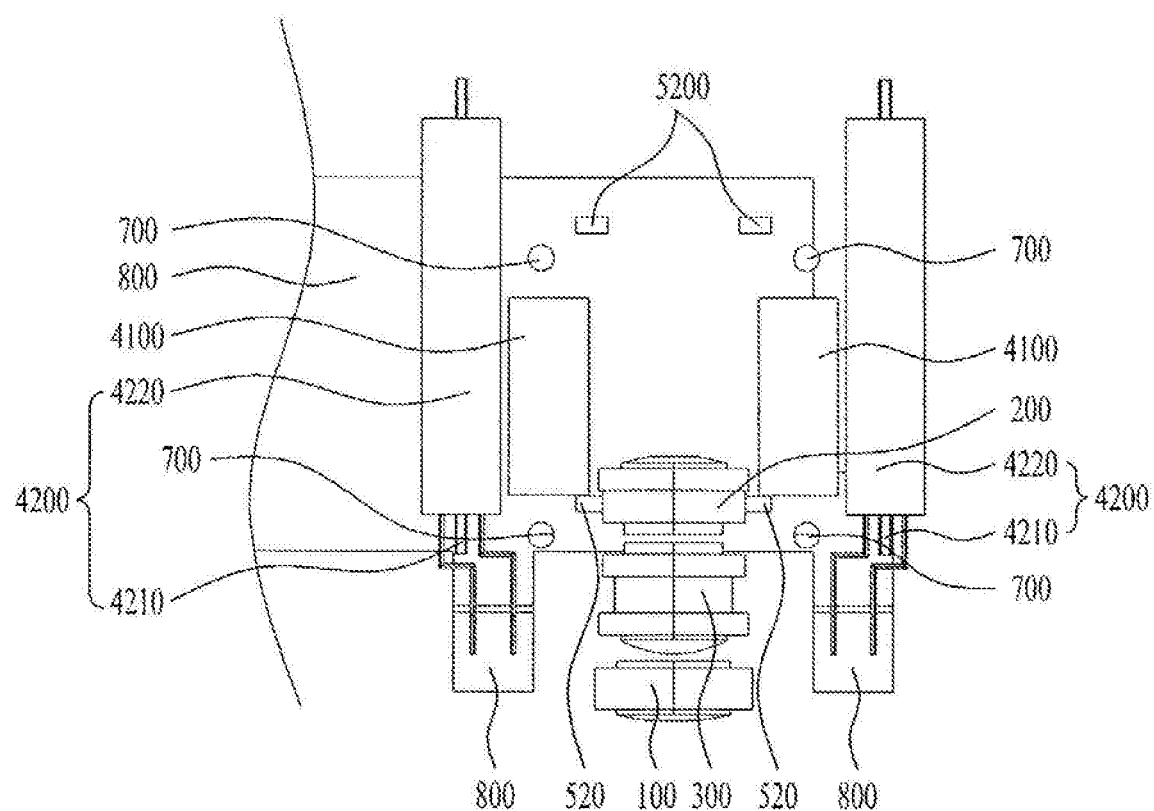

[FIG. 9]
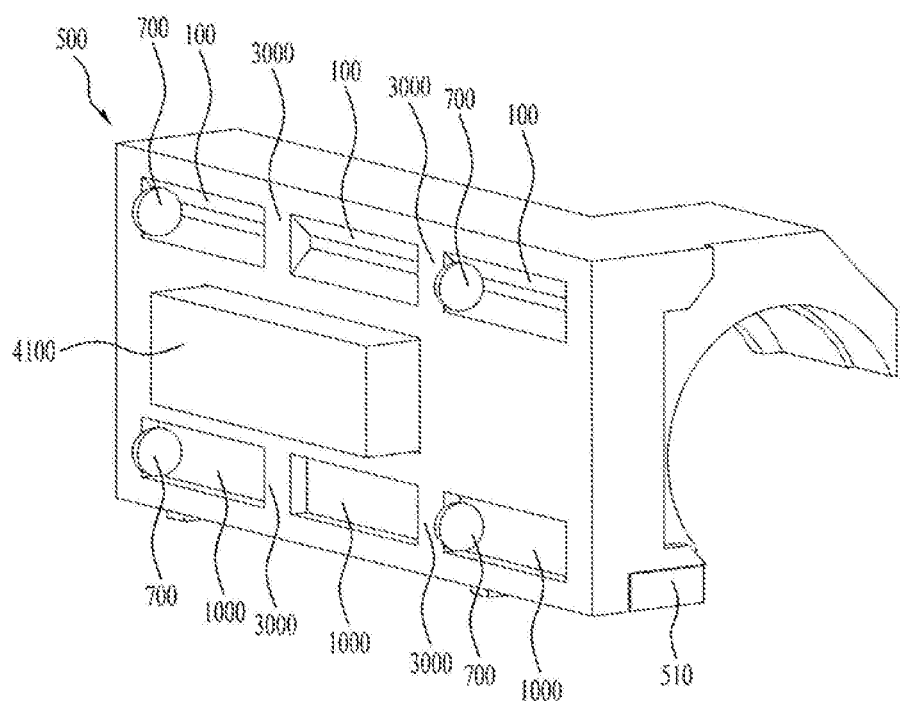

[FIG. 10]
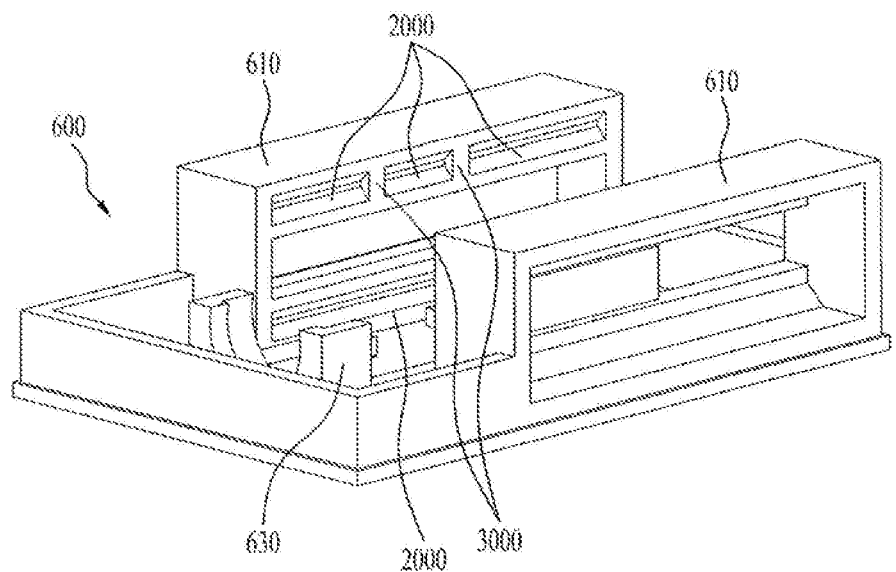
[FIG. 11]
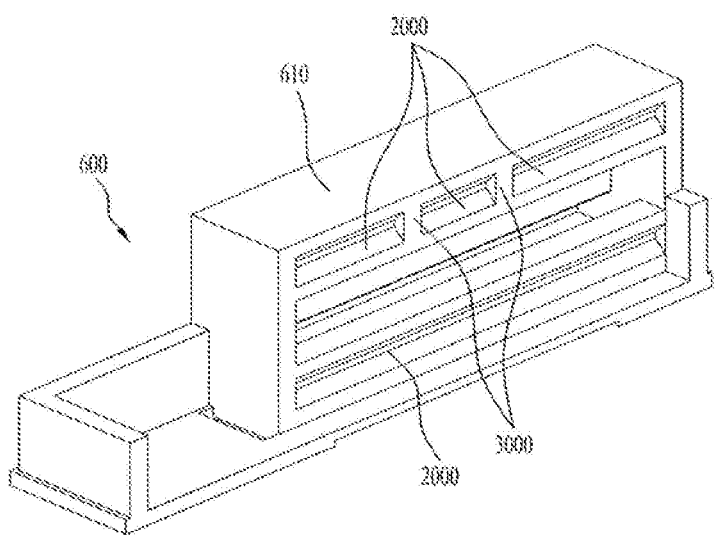

[FIG. 12]
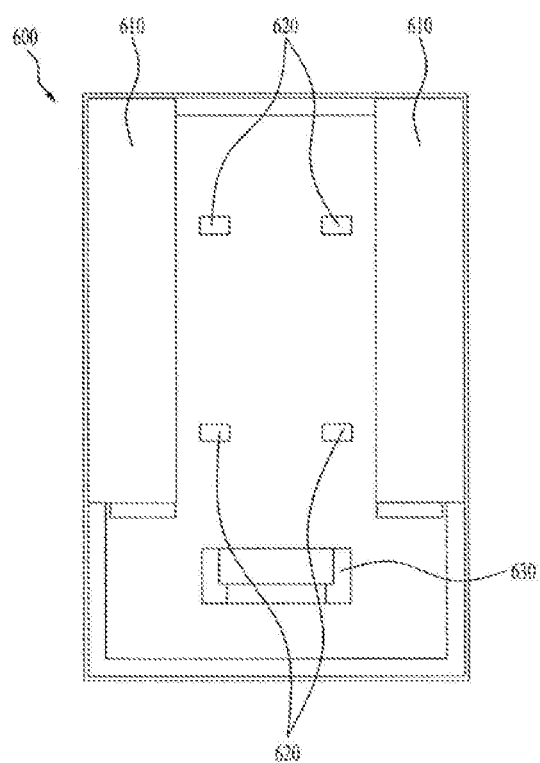

【FIG. 13】
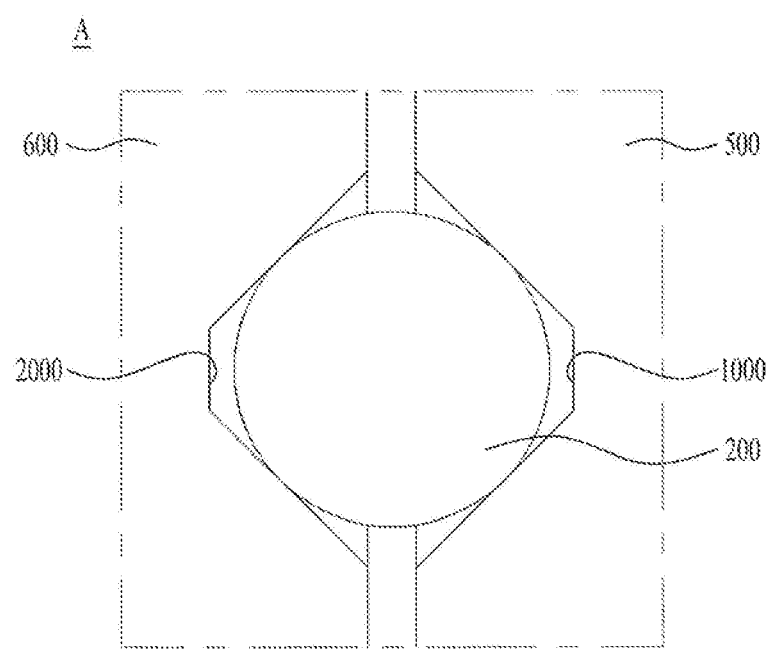

【FIG. 14】
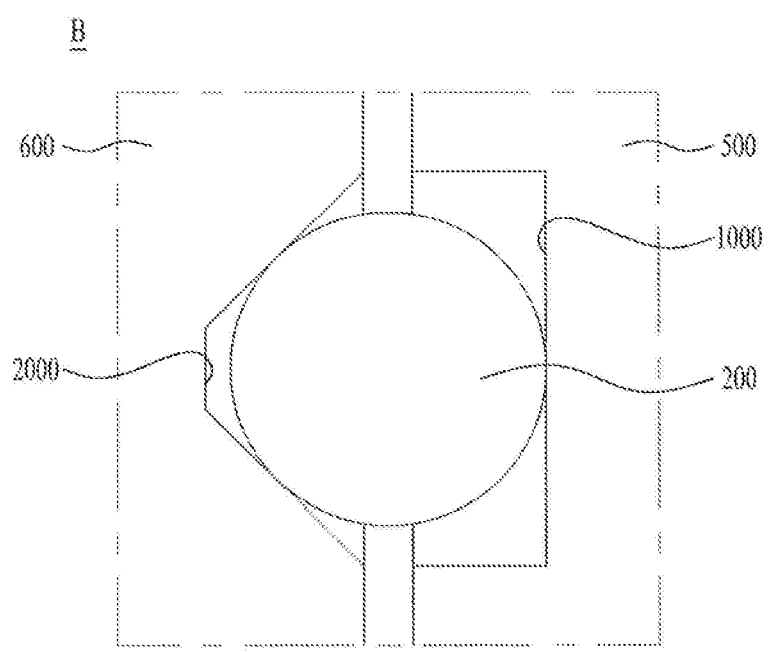

CAMERA MODULE

CROSS REFERENCE TO RELATED APPLICATIONS

This application is the National Phase of PCT International Application No. PCT/KR2019/002130, filed on Feb. 21, 2019, which claims priority under 35 U.S.C. 119(a) to Patent Application No. 10-2018-0022126, filed in the Republic of Korea on Feb. 23, 2018, all of which are hereby expressly incorporated by reference into the present application.

TECHNICAL FIELD

Embodiments relate to a camera module configured to perform auto-focusing and zoom-up functions.

BACKGROUND ART

The content described in this section merely provides background information regarding embodiments, and does not constitute the conventional art.

Mobile phones or smartphones equipped with camera modules that take an image or a video of an object and store the same have been developed. In general, a camera module may include a lens, an image sensor module, and a lens-moving device for adjusting the distance between the lens and the image sensor module.

Mobile devices, such as mobile phones, smartphones, tablet PCs, and laptops, have built-in miniature camera modules. Camera modules may perform an auto-focusing function of adjusting the distance between an image sensor and a lens to control the focal length of the lens.

Meanwhile, camera modules may also perform a zoom-up function, i.e. a function of photographing an object located a long distance away with increased magnification.

Since miniature camera modules have a limited size, there is a problem in that it is difficult to construct miniature camera modules such that they perform a zoom-up function of the type implemented in general large-scale cameras.

DISCLOSURE

Technical Problem

Embodiments relate to a camera module configured to perform auto-focusing and zoom-up functions.

The objects to be accomplished by the embodiments are not limited to the above-mentioned objects, and other objects not mentioned herein will be clearly understood by those skilled in the art from the following description.

Technical Solution

A camera module according to an embodiment may include a first lens group on which light is incident, a second lens group disposed so as to be spaced apart from the first lens group in an optical-axis direction, a third lens group disposed between the first lens group and the second lens group, a first mover coupled to the second lens group to move the second lens group in the optical-axis direction, a second mover coupled to the third lens group to move the third lens group in the optical-axis direction, a base accommodating the first mover and the second mover, and a support ball disposed to be in rolling contact with the first mover, the second mover, and the base, the support ball supporting movement of the first mover and the second mover relative to the base.

Each of the first mover and the second mover may include a first groove formed in a portion thereof that faces the base, the first groove being disposed such that the longitudinal direction thereof is oriented in the optical-axis direction. The base may include a second groove formed therein at a position corresponding to the position of the first groove, the second groove having a shape corresponding to the shape of the first groove. The support ball may be disposed in a space formed by the first groove and the second groove.

At least one of the first groove or the second groove may include at least one stopper formed to protrude therefrom to limit the moving distance of the support ball in the optical-axis direction.

The base may include a pair of protruding portions spaced apart from each other in a direction perpendicular to the optical-axis direction and disposed such that the longitudinal direction thereof is oriented in the optical-axis direction. The second groove may be formed in each of the pair of protruding portions, and the first groove may be formed in each of the first mover and the second mover at a position corresponding to the positon of the second groove.

The second groove may be formed in each of upper portions and lower portions of the protruding portions, and the first groove may be formed in each of upper portions and lower portions of the first mover and the first mover at a position corresponding to the position of the second groove.

A camera module according to an embodiment may further include a driving magnet coupled to each of the first mover and the second mover and a coil part coupled to the base and disposed to face the driving magnet.

The coil part may include a yoke mounted to the base and disposed such that the longitudinal direction thereof is oriented in the optical-axis direction and a moving coil wound on the yoke and disposed to face the driving magnet.

The coil part may be disposed in each of the protruding portions, and may be spaced apart from the first groove and the second groove in a direction perpendicular to the optical-axis direction.

A camera module according to an embodiment may further include a sensing magnet disposed at a lower portion of each of the first mover and the second mover and a position sensor disposed to face the sensing magnet.

Each of the sensing magnet and the position sensor may be provided in a plural number in the optical-axis direction.

A camera module according to an embodiment may further include a printed circuit board coupled to the bottom surface of the base, and the position sensor may be coupled to the printed circuit board.

The base may include a through-hole formed in a portion thereof at which the position sensor is disposed, and the sensing magnet and the position sensor may face each other through the through-hole.

The base may include a mounting portion to which the first lens group is securely coupled.

A camera module according to another embodiment may include a first lens group on which light is incident, a second lens group disposed so as to be spaced apart from the first lens group in an optical-axis direction, a third lens group disposed between the first lens group and the second lens group, a first mover configured to move the second lens group in the optical-axis direction, a second mover configured to move the third lens group in the optical-axis direction, a base accommodating the first mover and the second mover, a support ball disposed to be in rolling contact with the first mover, the second mover, and the base, the support ball supporting movement of the first mover and the second mover relative to the base, a driving magnet coupled to each of the first mover and the second mover, and a coil part coupled to the base and disposed to face the driving magnet. The coil part may include a yoke disposed in the base and including long sides and short sides, the long sides being disposed to be oriented in the optical-axis direction, and a moving coil disposed to face the driving magnet and wound on the short sides of the yoke. The entirety of the surface of the driving magnet that faces the moving coil may serve as a first pole.

For example, each of the first mover and the second mover may include a first groove formed in a portion thereof that faces the base, the first groove being disposed such that the longitudinal direction thereof is oriented in the optical-axis direction. The base may include a second groove formed therein at a position corresponding to the position of the first groove, the second groove having a shape corresponding to the shape of the first groove. The support ball may be disposed in a space formed by the first groove and the second groove.

For example, at least one of the first groove or the second groove may include at least one stopper formed to protrude therefrom to limit the moving distance of the support ball in the optical-axis direction.

For example, the base may include a pair of protruding portions spaced apart from each other in a direction perpendicular to the optical-axis direction and disposed such that the longitudinal direction thereof is oriented in the optical-axis direction. The second groove may be formed in each of the pair of protruding portions, and the first groove may be formed in each of the first mover and the second mover at a position corresponding to the positon of the second groove.

For example, the second groove may be formed in each of upper portions and lower portions of the protruding portions, and the first groove may be formed in each of upper portions and lower portions of the first mover and the first mover at a position corresponding to the position of the second groove.

For example, the coil part may be disposed in each of the protruding portions, and may be spaced apart from the first groove and the second groove in a direction perpendicular to the optical-axis direction.

For example, the camera module may further include a sensing magnet disposed at a lower portion of each of the first mover and the second mover and a position sensor disposed to face the sensing magnet.

For example, each of the sensing magnet and the position sensor may be provided in a plural number in the optical-axis direction.

For example, the camera module may further include a printed circuit board coupled to the bottom surface of the base, and the position sensor may be coupled to the printed circuit board.

For example, the base may include a through-hole formed in a portion thereof at which the position sensor is disposed, and the sensing magnet and the position sensor may face each other through the through-hole.

Advantageous Effects

In an embodiment, since support balls roll relative to a base and a first mover, the generation of friction between the base and the first and second movers may be greatly reduced during movement of the first and second movers.

In an embodiment, the movement of the first and second movers in an optical-axis direction may be stably supported by the support balls that are in rolling contact therewith. Thus, compared with sliding contact, the amount of current consumed in order to move the first and second movers may be reduced, and the occurrence of tilting may be effectively reduced.

In an embodiment, since the first mover is capable of moving in the optical-axis direction due to rolling contact between the support balls and the first mover, a camera module capable of efficiently performing auto-focusing and zoom-up functions and having a simple structure may be realized.

In an embodiment, a stopper may be provided to limit the moving distance of the support balls in the optical-axis direction, thereby effectively preventing the occurrence of tilting, erroneous operation of the movers, the occurrence of noise due to collision between the support balls, and malfunction of the camera module.

DESCRIPTION OF DRAWINGS

FIG. 1 is a perspective view illustrating a camera module according to an embodiment.

FIG. 2 is a perspective view of FIG. 1, from which some components are removed.

FIG. 3 is a plan view of FIG. 1.

FIG. 4 is a cross-sectional view of FIG. 1 when viewed from the front.

FIG. 5 is a plan view of FIG. 2.

FIG. 6 is a front view of FIG. 5.

FIG. 7 is a plan view of FIG. 5, from which some components are removed.

FIG. 8 is a plan view of FIG. 7, from which some components are removed.

FIG. 9 is a perspective view illustrating a second mover according to an embodiment.

FIG. 10 is a perspective view illustrating a base according to an embodiment.

FIG. 11 is a perspective view illustrating the cross-section of FIG. 10.

FIG. 12 is a plan view of FIG. 10.

FIG. 13 is an enlarged view of portion A in FIG. 4.

FIG. 14 is an enlarged view of portion B in FIG. 4.

BEST MODE

Hereinafter, exemplary embodiments will be described in detail with reference to the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

In the description of the embodiments, the optical-axis direction is a direction that is the same as or parallel to the direction in which a first lens group 100 to a third lens group 300 are aligned.

FIG. 1 is a perspective view illustrating a camera module according to an embodiment. FIG. 2 is a perspective view of FIG. 1, from which some components are removed. FIG. 3 is a plan view of FIG. 1. FIG. 4 is a cross-sectional view of FIG. 1 when viewed from the front. FIG. 5 is a plan view of FIG. 2. FIG. 6 is a front view of FIG. 5. FIG. 7 is a plan view of FIG. 5, from which some components are removed.

Although not shown in the embodiment, the camera module may further include a cover member coupled to the base 600 to cover the components accommodated in the base 600. The cover member may be bonded to the base 600, and may protect the components of the camera module.

In addition, although not shown in the embodiment, the camera module may further include a prism, which is disposed in front of the first lens group 100 and is accommodated in the base 600 in order to change an optical path.

Referring to FIGS. 1 and 7, external light may be incident on the prism in a direction perpendicular to the optical-axis direction, i.e. in a direction perpendicular to the direction in which the first lens group 100 to the third lens group 300 are aligned.

The optical path of the external light incident on the prism may be changed by the prism so as to be oriented in the optical-axis direction, and thus, referring to FIG. 7, the external light may sequentially pass through the first lens group 100, the third lens group 300, and the second lens group 200.

The prism may have a total reflection surface, which is disposed to be oblique relative to the optical-axis direction. The external light incident on the prism may be totally reflected by the total reflection surface, and the optical path thereof may be changed so as to be oriented in the optical-axis direction.

Referring to FIGS. 1 to 7, the camera module according to the embodiment may include a first lens group 100, a second lens group 200, a third lens group 300, a first mover 400, a second mover 500, a base 600, a support ball 700, and a printed circuit board 800.

Each of the first lens group 100 to the third lens group 300 may be configured such that one or two or more lenses are aligned in the optical-axis direction to form an optical system and such that one or two or more lenses are mounted in a barrel.

The first lens group 100, the third lens group 300, and the second lens group 200 may be sequentially disposed in the optical-axis direction. External light may be incident on the first lens group 100, and may sequentially pass through the third lens group 300 and the second lens group 200.

Although not shown, an image sensor may be disposed behind the second lens group 200. The light emitted from the second lens group 200 may be incident on the image sensor, and the image sensor may form an image using the incident light.

In an embodiment, the distance between the first lens group 100, the third lens group 300, and the second lens group 200 may be adjusted in order to implement auto-focusing and zoom-up with respect to an image captured by the camera module.

In an embodiment, auto-focusing and zoom-up may be implemented by moving the second lens group 200 and the third lens group 300 in the optical-axis direction to adjust the distance between the first lens group 100 and the third lens group 300 and the distance between the third lens group 300 and the second lens group 200.

The first lens group 100, on which external light is incident, may be securely mounted in the camera module so as not to be moved in the optical-axis direction. Therefore, the base 600 may include a mounting portion 630, to which the first lens group 100 is securely coupled.

As shown in FIG. 1, the mounting portion 630 may be formed so as to protrude from the bottom surface of the base 600, and a groove having a shape corresponding to the outer circumferential surface of the first lens group 100 may be formed in a portion of the top surface of the mounting portion 630. The first lens group 100 may be seated in the groove in the mounting portion 630, and may be secured to the mounting portion 630 using an adhesive.

The second lens group 200 may be spaced apart from the first lens group 100 in the optical-axis direction, and may move in the optical-axis direction. The third lens group 300 may be disposed between the first lens group 100 and the second lens group 200, and may move in the optical-axis direction. The light emitted from the second lens group 200 may be incident on the image sensor, which is disposed behind the second lens group 200.

As the second lens group 200 and the third lens group 300 move in the optical-axis direction, the distance between the first lens group 100 and the third lens group 300 and the distance between the third lens group 300 and the second lens group 200 may be adjusted, whereby the camera module may implement auto-focusing and zoom-up.

The first mover 400 may be coupled to the second lens group 200 so as to move the second lens group 200 in the optical-axis direction. The first mover 400 may include a first member 401 and a second member 402.

The first member 401 may be disposed such that the longitudinal direction thereof is oriented in the optical-axis direction, and a driving magnet 4100 and a sensing magnet 5100 may be mounted thereto. The second member 402 may protrude from the first member 401 in a direction perpendicular to the optical-axis direction, and the second lens group 200 may be coupled thereto.

The first member 401 may move in the optical-axis direction due to the electromagnetic interaction between the driving magnet 4100 and the coil part 4200, and accordingly, the second member 402 and the second lens group 200, coupled to the second member 402, may move in the optical-axis direction.

The second mover 500 may be coupled to the third lens group 300 to move the third lens group 300 in the optical-axis direction. The second mover 500 may have a structure substantially similar to that of the first mover 400, except that the portion thereof that corresponds to the second member 402 of the first mover 400 is disposed further forwards than the second member 402 of the first mover 400 in the optical-axis direction.

Accordingly, hereinafter, content related to the first mover 400 and the second mover 500 will be described in common, except where otherwise noted.

The base 600 may accommodate the first lens group 100 to the third lens group 300, the first mover 400, and the second mover 500, and as described above, the first lens group 100 may be securely mounted to the mounting portion 630 provided in the base 600.

The printed circuit board 800 may be coupled to the bottom surface of the base 600. The printed circuit board 800 may be electrically connected to a moving coil 4220 and a position sensor 5200 to supply the current required in order to drive the camera module. In addition, the printed circuit board 800 may be provided with a controller (not illustrated), or may be electrically connected to a separately provided controller.

The part of the printed circuit board 800 that is connected to opposite ends of the moving coil 4220 may be disposed on the top surface of the base 600. To this end, a hole may be formed in the printed circuit board 800, a part of the printed circuit board 800 may be disposed on the top surface of the base 600 through the hole, and the opposite ends of the moving coil 4220 may be connected to the part of the printed circuit board 800 that is disposed on the top surface of the base 600.

The opposite ends of the moving coil 4220 and the printed circuit board 800 may be electrically connected to each other using, for example, a conductive adhesive or a soldering method.

The support ball 700 may be in rolling contact with the first mover 400, the second mover 500, and the base 600, and may support the movement of the first mover 400 and the second mover 500 relative to the base 600.

Each of the first mover 400 and the second mover 500 may include a first groove 1000 formed in a portion thereof that faces the base 600. The first groove 1000 may be disposed such that the longitudinal direction thereof is oriented in the optical-axis direction. In addition, the base 600 may include a second groove 2000 formed in a portion thereof corresponding to the position of the first groove 1000. The second groove 2000 may have a shape corresponding to the shape of the first groove 1000.

In this case, the support ball 700 may be disposed in the space formed by the first groove 1000 and the second groove 2000. Hereinafter, a structure in which the support ball 700 is disposed will be described in more detail with reference to FIGS. 1, 2 and 4.

Referring to FIGS. 1, 2 and 4, the first groove 1000 may be formed in the first member 401 of the first mover 400 in the longitudinal direction of the first member 401, i.e. in the optical-axis direction. That is, the first groove 1000 may be formed in a slit shape in the longitudinal direction of the first member 401.

In addition, the second groove 2000 may be formed in the portion of the base 600 that faces the first groove 1000 so as to be disposed at a position corresponding to the position of the first groove 1000 and to have a shape corresponding to the shape of the first groove 1000.

The first groove 1000 and the second groove 2000 may be substantially the same shape. However, in the case where a stopper 3000 is formed, the shapes of the first and second grooves 1000 and 2000 may be different from each other in a region in which the stopper 3000 is formed due to the stopper 3000.

The stopper 3000 may protrude from the first groove 1000 or the second groove 2000 so as to limit the moving distance of the support ball 700 in the optical-axis direction. A detailed description of the stopper 3000 will be made later with reference to FIGS. 9 to 11.

For example, the base 600 may include a pair of protruding portions 610, which are spaced apart from each other in a direction perpendicular to the optical-axis direction and are disposed such that the longitudinal direction thereof is oriented in the optical-axis direction. The second groove 2000 may be formed in each of the pair of protruding portions 610.

In this case, the first groove 1000 may be formed in each of the first mover 400 and the second mover 500 at a position corresponding to the position of the second groove 2000.

Further, the second groove 2000 may be formed in each of the upper portions and the lower portions of the protruding portions 610, and the first groove 1000 may be formed in each of the upper portions and the lower portions of the first mover 400 and the first mover 400 at a position corresponding to the position of the second groove 2000.

Therefore, referring to FIG. 4, a total of four first grooves 1000 may be provided such that two first grooves 1000 are formed in the upper and lower portions of each of the first mover 400 and the second mover 500, and a total of four second grooves 2000 may be provided such that two second grooves 2000 are formed in the upper and lower portions of each of the pair of protruding portions 610.

Further, a plurality of support balls 700 may be provided in the optical-axis direction in each of the spaces formed by the first grooves 1000 and the second grooves 2000. The number of support balls 700 that are disposed in the optical-axis direction may be appropriately set in consideration of the weight of the camera module and smooth movement of the first mover 400 and the second mover 500.

Due to the structure described above, the support balls 700 may support movement of the first mover 400 relative to the base 600 in the optical-axis direction. During movement of the first mover 400, the support balls 700 may roll relative to the base 600 and the first mover 400.

In this case, since the support balls 700 are restricted by the first grooves 1000 and the second grooves 2000, the support balls 700 are capable of moving linearly in the optical-axis direction while rolling, but are prevented from moving linearly along a plane perpendicular to the optical-axis direction.

In the embodiment, since the support balls 700 roll relative to the base 600 and the first mover 400, the generation of friction between the base 600 and the first mover 400 may be greatly reduced during movement of the first mover 400.

In the case where the support balls 700 are not provided in the camera module, sliding contact occurs between the first mover 400 and the base 600 during movement of the first mover 400, and thus a very large amount of friction may be generated compared with rolling contact.

When a large amount of friction is generated due to sliding contact, the amount of current consumed in order to move the first mover 400 may increase, and a tilting phenomenon may occur in which the first mover 400 moves in a direction other than the direction parallel to the optical-axis direction due to the large amount of friction, thus making it difficult to ensure accurate movement of the first mover 400.

Therefore, in the embodiment, the movement of the first mover 400 in the optical-axis direction may be stably supported by the support balls 700. Thus, compared with sliding contact, the amount of current consumed in order to move the first mover 400 may be reduced, and the occurrence of tilting may be effectively reduced.

The first mover 400 may be supported and guided by the support balls 700, and thus may move linearly in the optical-axis direction without the occurrence of separate rotational movement thereof.

In the embodiment, since the first mover 400 is capable of moving in the optical-axis direction due to rolling contact between the support balls 700 and the first mover 400, a camera module capable of efficiently performing auto-focusing and zoom-up functions and having a simple structure may be realized.

Like the first mover 400 described above, the second mover 500 may also have a structure in which the support balls 700 are disposed in the first grooves 1000 formed therein. Since the concrete structure of the second mover 500 is similar to that of the first mover 400 described above, a duplicate description thereof will be omitted.

Hereinafter, a driving device for moving the first mover 400 and the second mover 500 in the optical-axis direction will be described in detail with reference to FIGS. 2 and 4 to 6. Since the first mover 400 and the second mover 500 have similar structures, the first mover 400 and the second mover 500 will be hereinafter collectively referred to as a "mover".

The driving device for moving the mover in the optical-axis direction may include a driving magnet 4100 and a coil part 4200. The driving magnet 4100 may be coupled to each of the first mover 400 and the second mover 500, and the coil part 4200 may be coupled to the base 600 and may be disposed opposite the driving magnet 4100.

For example, referring to FIG. 4, the driving magnet 4100 may be coupled to the first member 401 of the mover. A portion of the driving magnet 4100 may protrude in the lateral direction of the first member 401, and may be disposed in the space formed between the second grooves 2000 formed in the upper and lower portions of the protruding portion 610 of the base 600. The driving magnet 4100 may be secured to the first member 401 using an adhesive.

Since the moving distances in the optical-axis direction and the moving directions of the first mover 400 and the second mover 500 are independently controlled, the driving magnet 4100 and the coil part 4200 may be provided at positions corresponding to each of the first mover 400 and the second mover 500.

Accordingly, referring to FIG. 4, two driving magnets 4100 for driving the first mover 400 and the second mover 500 may be disposed so as to be spaced apart from each other in a direction perpendicular to the optical-axis direction.

Further, similar to the two driving magnets 4100, two coil parts 4200, which are respectively disposed opposite the two driving magnets 4100 so as to undergo electromagnetic interaction therewith, may be disposed so as to be spaced apart from each other in a direction perpendicular to the optical-axis direction.

The driving magnet 4100 may be coupled to the mover. It is preferable for the driving magnet 4100 to be disposed further outwards than the mover in a direction perpendicular to the optical-axis direction so as to be located at a position close to the coil part 4200.

The driving magnet 4100 may be a permanent magnet. Only one driving magnet 4100 may be provided. However, in another embodiment, the driving magnet 4100 may be configured as a plurality of permanent magnets stacked in a direction perpendicular to the optical-axis direction.

The coil part 4200 may be coupled to the base 600, and may be disposed opposite the driving magnet 4100. Further, the coil part 4200 may be disposed at the protruding portion 610, and may be spaced apart from the first grooves 1000 and the second grooves 2000 in a direction perpendicular to the optical-axis direction. The coil part 4200 may include a yoke 4210 and a moving coil 4220.

The yoke 4210 may be mounted to the base 600, and may be disposed such that the longitudinal direction thereof is oriented in the optical-axis direction. The moving coil 4220 may be wound on the yoke 4210, and a part thereof may be disposed opposite the driving magnet 4100. Since the longitudinal direction of the moving coil 4220 wound on the yoke 4210 is oriented in the optical-axis direction, a part of the moving coil 4220 in the longitudinal direction may have a linear shape.

The yoke may have the shape of a rectangle including long sides and short sides, and the long sides thereof may be disposed parallel to the optical-axis direction. The moving coil may be wound on the short sides of the yoke. The magnet, which faces the wound coil, may be a permanent magnet, of which the surface facing the wound coil is magnetized to one pole (the N-pole or the S-pole). That is, the surface of the driving magnet that faces the driving coil may serve as a first pole (the N-pole or the S-pole), and the opposite surface thereof may serve as a second pole (the S-pole or the N-pole).

The coil part 4200 may be disposed in the space formed in the base 600. For example, referring to FIG. 4, the coil part 4200 may be disposed in a mounting space formed in the protruding portion 610 of the base 600. In this case, the coil part 4200 and the driving magnet 4100 may be disposed opposite each other while being spaced apart from each other.

In order to couple the coil part 4200 to the base 600, for example, opposite ends of the yoke 4210 may be secured to the base 600. In another embodiment, the yoke 4210 and the moving coil 4220 may be bonded to the base 600 using an adhesive filler.

Opposite ends of the moving coil 4220 may be electrically connected to the printed circuit board 800, and thus the moving coil 4220 may receive current from an external power source (not illustrated).

When current is applied to the moving coil 4220, an electromagnetic interaction may occur between the moving coil 4220 and the driving magnet 4100, and the mover, to which the driving magnet 4100 is coupled, may move in the optical-axis direction, depending on the direction in which the current is applied, according to Fleming's left-hand rule.

It is possible to adjust the moving direction of the mover in the optical-axis direction, i.e. to determine whether to move the mover toward the first lens group 100 or to move the mover in the opposite direction, by adjusting the direction in which the current is applied to the moving coil 4220. Further, it is also possible to adjust the moving distance of the mover in the optical-axis direction by adjusting the time period during which the current is applied to the moving coil 4220.

As described above, the moving direction and the moving distance of the mover may be adjusted through interaction between the moving coil 4220 and the driving magnet 4100, whereby the camera module is capable of performing the auto-focusing and zoom-up functions.

As described above, in the embodiment, the third lens group 300 and the second lens group 200 may be sequentially provided behind the first lens group 100, and the moving directions and the moving distances of the second lens group 200 and the third lens group 300 may be independently adjusted by the first mover 400 and the second mover 500. Thus, the camera module according to the embodiment is capable of efficiently and accurately performing the auto-focusing and zoom-up functions.

Hereinafter, a structure for detecting the moving positions of the first mover 400 and the second mover 500 in the optical-axis direction will be described in detail with reference to FIGS. 6 to 8. FIG. 8 is a plan view of FIG. 7, from which some components are removed.

Referring to FIGS. 6 to 8, the device for detecting the moving position of the mover in the optical-axis direction may include sensing magnets 5100 and position sensors 5200. The sensing magnets 5100 may be disposed at the lower portions of the first mover 400 and the second mover 500, and the position sensors 5200 may be disposed to face the sensing magnets 5100.

Since the moving distances in the optical-axis direction and the moving directions of the first mover 400 and the second mover 500 are independently controlled, two pairs of sensing magnets 5100 and two pairs of position sensors 5200 may be provided, and the two pairs of sensing magnets 5100 and the two pairs of position sensors 5200 may be separately disposed at mutually different positions.

Therefore, as shown in FIGS. 7 and 8, two sensing magnets 5100 for sensing movement of the first mover 400 and the second mover 500 may be disposed so as to be spaced apart from each other in a direction perpendicular to the optical-axis direction.

In addition, two position sensors 5200, which are disposed to respectively face the two sensing magnets 5100, may also be disposed so as to be spaced apart from each other in a direction perpendicular to the optical-axis direction, like the two sensing magnets 5100.

Meanwhile, a plurality of sensing magnets 5100 and a plurality of position sensors 5200 may be provided in the optical-axis direction. In an embodiment, referring to FIGS. 7 and 8, two sensing magnets 5100 and two position sensors 5200 are disposed in the optical-axis direction.

Since a plurality of sensing magnets 5100 and a plurality of position sensors 5200 are provided in the optical-axis direction, the camera module is capable of more accurately sensing the moving position and the moving direction of the mover compared to a configuration in which a single sensing magnet 5100 and a single position sensor 5200 are provided in the optical-axis direction.

Meanwhile, in order to avoid magnetic interference with the driving magnet 4100, the sensing magnet 5100 may need to be spaced apart from the driving magnet 4100.

Therefore, as shown in FIG. 6, the sensing magnet 5100 may be disposed at the lower portion of the mover, and the driving magnet 4100 may be disposed on the side surface of the mover. Thus, the sensing magnet 5100 and the driving magnet 4100 may be spaced apart from each other in an upward-downward direction, perpendicular to the optical-axis direction.

Further, the position sensor 5200, which is disposed to face the sensing magnet 5100, may be disposed below the sensing magnet 5100. Thus, the position sensor 5200 and the driving magnet 4100 may be spaced apart from each other in an upward-downward direction, perpendicular to the optical-axis direction.

The position sensor 5200 may be mounted to the top surface of the printed circuit board 800, which is disposed below the mover, and thus may be disposed below the sensing magnet 5100. Therefore, the position sensor 5200 may be disposed so as to be spaced apart from the driving magnet 4100 in an upward-downward direction.

Meanwhile, the position sensor 5200 may malfunction due to the current applied to the coil part 4200, and it is therefore preferable for the position sensor 5200 and the coil part 4200 to be spaced apart from each other.

Therefore, as shown in FIG. 6, the coil part 4200 may be disposed at the protruding portion 610 of the base 600, and the position sensor 5200 may be coupled to the printed circuit board 800, and may be disposed to face the sensing magnet 5100 disposed at the lower portion of the mover.

Due to the structure described above, the position sensor 5200 may be disposed in a plane perpendicular to the optical-axis direction so as to be spaced apart from the coil part 4200 in the horizontal direction and the vertical direction.

As described above, although the sensing magnets 5100 and the position sensors 5200, which are provided in pairs in relation to each of the first mover 400 and the second mover 500, are disposed at different positions, they have similar structures and perform similar functions, and thus will be described collectively.

The sensing magnet 5100 may be securely coupled to the mover, and thus, when the mover moves, the sensing magnet 5100 may move together therewith in the optical-axis direction. The sensing magnet 5100 may be configured as a permanent magnet, and may be provided in a singular number. However, the sensing magnet 5100 may be formed in a structure in which a plurality of magnets is stacked.

The position sensor 5200 may be coupled to the printed circuit board 800, and may be disposed opposite the sensing magnet 5100. The position sensor 5200 may be configured to sense a change in the magnetic force of the sensing magnet 5100, and may be configured as, for example, a hall sensor.

The printed circuit board 800 may be coupled to the bottom surface of the base 600, and the position sensor 5200 may be disposed so as to be coupled to the portion that faces the sensing magnet 5100. The printed circuit board 800 may be electrically connected to the position sensor 5200 to apply the current supplied from an external power source to the position sensor 5200.

The signal transmitted from the position sensor 5200 may be transmitted to a controller, which is provided on the printed circuit board 800 or is connected to the printed circuit board 800, through the printed circuit board 800.

When the sensing magnet 5100 moves together with the mover, the magnetic field of the sensing magnet 5100 changes. The detection sensor, which is securely disposed at a position opposite the sensing magnet 5100, may sense the change in the magnetic field of the sensing magnet 5100, thereby detecting information about the movement of the mover, such as the moving direction or moving speed of the mover.

The information about the movement of the mover detected by the position sensor 5200 may be transmitted to the controller, and the controller may perform feedback control of the moving direction, moving speed, and moving position of the mover based on the information about the movement.

The camera module is capable of efficiently and accurately performing the auto-focusing and zoom-up functions through the feedback control of the mover by the controller.

Hereinafter, the first groove 1000 and the second groove 2000 will be described in more detail with reference to FIGS. 9 to 11. FIG. 9 is a perspective view illustrating the second mover 500 according to an embodiment. FIG. 10 is a perspective view illustrating the base 600 according to an embodiment. FIG. 11 is a perspective view illustrating the cross-section of FIG. 10.

A stopper 3000 may be formed in the first groove 1000 in the mover or in the second groove 2000 in the base 600. The stopper 3000 may be formed in any one of the first groove 1000 and the second groove 2000, or may be formed both in the first groove 1000 and in the second groove 2000.

In the case in which stoppers 3000 are formed both in the first groove 1000 and in the second groove 2000, the stoppers 3000, which are respectively formed in the first groove 1000 and the second groove 2000, may be preferably disposed at positions corresponding to each other.

As shown in FIGS. 9 to 11, the stopper 3000 may be formed in a structure that fills a portion of the first groove 1000 or the second groove 2000. The stopper 3000 may limit the moving distance of the support ball 700 in the optical-axis direction.

In the case in which the stopper 3000 is not formed, the following problems may occur. If the stopper 3000 is absent, the support ball 700 inserted into the first groove 1000 and the second groove 2000 may be biased to a specific region.

For example, in the case in which a plurality of support balls 700 is provided, all of the plurality of support balls 700 may be biased to the front portions or the rear portions of the first groove 1000 and the second groove 2000, whereby the support balls 700 may not uniformly support the mover in the optical-axis direction.

Due to non-uniform support of the support balls 700, a tilting phenomenon may occur in which the first mover 400 moves in a direction other than the direction parallel to the optical-axis direction, leading to erroneous operation of the mover.

Further, if the plurality of support balls 700 is biased to specific portions of the first groove 1000 and the second groove 2000, the support balls 700 may collide with each other, which may cause the occurrence of noise or malfunction of the camera module.

Therefore, in the embodiment, the stopper 3000 is provided to limit the moving distance of the support balls 700 in the optical-axis direction, thereby effectively preventing the occurrence of tilting, erroneous operation of the mover, the occurrence of noise due to collision between the support balls 700, and malfunction of the camera module.

Since the stopper 3000 is formed in the first groove 1000 or in the second groove 2000, the first groove 1000 or the second groove 2000 may be divided into a plurality of grooves that are disposed in a row in the optical-axis direction. In the embodiment, referring to FIG. 9, among three first grooves 1000, a single support ball 700 is inserted into each of the first grooves 1000 disposed at the front and rear positions, except for the first groove 1000 disposed at the middle position.

In order to prevent collision between the support balls 700, it may be preferable that a single support ball 700 be inserted into each of the plurality of first grooves 1000.

Each support ball 700 may be inserted into a respective one of all of the plurality of first grooves 1000. However, as shown in FIG. 9, each support ball 700 may be inserted into a respective one of some of the plurality of first grooves 1000.

In the case in which each support ball 700 is inserted into a respective one of some of the plurality of first grooves 1000, as shown in FIG. 9, it is preferable for the support balls 700 to be inserted into the first grooves 1000 disposed at the front and rear positions, except for the first groove 1000 disposed at the middle position, among the three first grooves 1000, thereby enabling the support balls 700 to uniformly support the first mover 400 in the optical-axis direction.

Meanwhile, the second groove 2000 may have a structure similar to that of the first groove 1000 described above. Therefore, a duplicate description thereof will be omitted.

However, referring to FIG. 11, the stopper 3000 may not be formed in the second groove 2000 formed in the lower portion of the protruding portion 610. This is because the stopper 3000 is formed in the first groove 1000 that corresponds to the second groove 2000 formed in the lower portion of the protruding portion 610. Since the moving distance of the support ball 700 is sufficiently limited by the stopper 3000 formed in the first groove 1000, it is not necessary to form the stopper 3000 in the second groove 2000 formed in the lower portion of the protruding portion 610.

That is, as described above, the stopper 3000 may be formed in only one of the first groove 1000 and the second groove 2000, so long as it is capable of limiting the moving distance of the support ball 700. Of course, the stoppers 3000 may be formed both in the first groove 1000 and in the second groove 2000.

FIG. 12 is a plan view of FIG. 10. As shown in FIG. 12, a through-hole 620 may be formed in the base 600. That is, the through-hole 620 may be formed in the portion of the base 600 at which the position sensor 5200 is disposed, whereby the sensing magnet 5100 and the position sensor 5200 may face each other through the through-hole 620.

Since the through-hole 620 is formed in the base 600 and the position sensor 5200 is disposed in the through-hole 620, the position sensor 5200 may face the sensing magnet 5100 without interference with the base 600, thereby accurately sensing the moving distance of the mover in the optical-axis direction, the moving direction of the mover, and the moving speed of the mover.

FIG. 13 is an enlarged view of portion A in FIG. 4. FIG. 14 is an enlarged view of portion B in FIG. 4.

As shown in FIGS. 13 and 14, it is preferable for the first groove 1000 and the second groove 2000 to have a cross-sectional shape that is capable of minimizing the contact area between the support ball 700, the first groove 1000, and the second groove 2000. This is because, as the contact area decreases, the amount of friction generated by the movement of the mover may decrease.

Therefore, as exemplarily shown in FIG. 13, the cross-section of each of the first groove 1000 and the second groove 2000 may be formed such that the width thereof gradually increases toward the opening thereof.

In another embodiment, as shown in FIG. 14, any one of the first groove 1000 and the second groove 2000 may be formed such that the width thereof gradually increases toward the opening thereof, and the remaining one thereof may be formed such that the width of the opening thereof and the width of the inner portion thereof are the same.

However, the first groove 1000 and the second groove 2000 may be formed to have any of various cross-sectional shapes, so long as the contact area between the support ball 700, the first groove 1000, and the second groove 2000 is capable of being reduced.

Although only a limited number of embodiments have been described above, various other embodiments are possible. The technical contents of the above-described embodiments may be combined into various forms as long as they are not incompatible with one another, and thus may be implemented in new embodiments.

MODE FOR INVENTION

Various embodiments have been described in the best mode for carrying out the disclosure.

INDUSTRIAL APPLICABILITY

A camera module according to embodiments may be applied to portable devices such as, for example, mobile phones, smartphones, tablet PCs, or laptop computers.

The invention claimed is:

1. A camera module, comprising:
a first lens group on which light is incident;
a second lens group disposed so as to be spaced apart from the first lens group in an optical-axis direction;
a third lens group disposed between the first lens group and the second lens group;
a first mover configured to move the second lens group in the optical-axis direction;
a second mover configured to move the third lens group in the optical-axis direction;
a base accommodating the first mover and the second mover;
a first support ball disposed to be in rolling contact with the first mover and the base, the first support ball supporting movement of the first mover relative to the base;
a second support ball disposed to be in rolling contact with the second mover and the base, the second support ball supporting movement of the second mover relative to the base;
a driving magnet coupled to each of the first mover and the second mover; and
a coil part coupled to the base, the coil part being disposed to face the driving magnet,
wherein the coil part comprises:
a yoke disposed in the base, the yoke comprising long sides and short sides, the long sides being disposed to be oriented in the optical-axis direction; and
a moving coil disposed to face the driving magnet, the moving coil being wound on the short sides of the yoke, and
wherein an entirety of a surface of the driving magnet that faces the moving coil serves as a first pole, and
wherein a portion of the first mover extends along a portion of the second mover in the optical-axis direction.

2. The camera module according to claim 1, wherein each of the first mover and the second mover comprises a first groove formed in a portion thereof that faces the base, each of the first grooves being disposed such that a longitudinal direction thereof is oriented in the optical-axis direction,
wherein the base comprises a second groove formed therein at a position corresponding to a position of each of the first grooves of the first mover and the second mover, each of the second grooves having a shape corresponding to a shape of the corresponding first groove of the first mover and the second mover,
wherein the first support ball is disposed in a space formed by the first groove of the first mover and the corresponding second groove of the base, and
wherein the second support ball is disposed in a space formed by the first groove of the second mover and the corresponding second groove of the base.

3. The camera module according to claim 2, wherein at least one of the first grooves or the second grooves comprises:
at least one stopper formed to protrude therefrom to limit a moving distance of the first and second support balls in the optical-axis direction.

4. The camera module according to claim 3, wherein the base comprises a pair of protruding portions spaced apart from each other in a direction perpendicular to the optical-axis direction and disposed such that a longitudinal direction thereof is oriented in the optical-axis direction, and
wherein each of the protruding portions includes one of the second grooves of the base.

5. The camera module according to claim 4, wherein the second groove of each of the protruding portions is formed as a plurality of second groves to be located in each of upper portions and lower portions of the protruding portions, and
wherein each of the first grooves of the first and second movers is formed as a plurality of first grooves in each of upper portions and lower portions of the first mover and the second mover.

6. The camera module according to claim 4, wherein the coil part is disposed in each of the protruding portions, and is spaced apart from the first groove and the second groove in a direction perpendicular to the optical-axis direction.

7. The camera module according to claim 4, wherein the stopper is not formed in the second groove formed in a lower portion of the protruding portion.

8. The camera module according to claim 2, wherein the first and second support balls are inserted into a respective first groove of the first and second movers.

9. The camera module according to claim 2, wherein a cross-section of each of the first groove and the second groove is formed such that a width thereof gradually increases toward an opening thereof.

10. The camera module according to claim 2, wherein any one of the first groove and the second groove is formed such that a width thereof gradually increases toward an opening thereof, and
wherein a remaining one of the first groove and the second groove is formed such that a width of the opening thereof and a width of an inner portion thereof are the same.

11. The camera module according to claim 1, further comprising:
a sensing magnet disposed at a lower portion of each of the first mover and the second mover; and
a position sensor disposed to face the sensing magnet.

12. The camera module according to claim 11, wherein each of the sensing magnet and the position sensor is provided in a plural number in the optical-axis direction.

13. The camera module according to claim 12, further comprising:
a printed circuit board coupled to a bottom surface of the base,
wherein the position sensor is coupled to the printed circuit board.

14. The camera module according to claim 13, wherein the base comprises a through-hole formed in a portion thereof at which the position sensor is disposed, the sensing magnet and the position sensor facing each other through the through-hole.

15. The camera module according to claim 11, wherein the first mover comprises:

a first member disposed such that a longitudinal direction thereof is oriented in the optical-axis direction, the driving magnet and the sensing magnet being mounted to the first member; and a second member protruding from the first member in a direction perpendicular to the optical-axis direction, and the second lens group being coupled to the second member.

16. The camera module according to claim 11, wherein the sensing magnet is spaced apart from the driving magnet.

17. The camera module according to claim 11, wherein the driving magnet is disposed on a side surface of each of the first mover and the second mover, and wherein the sensing magnet and the driving magnet are spaced apart from each other in an upward-downward direction, perpendicular to the optical-axis direction.

18. The camera module according to claim 11, wherein the position sensor and the coil part are disposed to be spaced apart from each other.

19. The camera module according to claim 11, wherein the sensing magnet moves together with the first and second movers.

20. The camera module according to claim 1, wherein the base includes a mounting portion, to which the first lens group is securely coupled.

* * * * *